United States Patent [19]

Miller et al.

[11] Patent Number: 5,164,171
[45] Date of Patent: Nov. 17, 1992

[54] REMOVAL OF CARBONATE FROM CAUSTIC SULFIDE SOLUTION

[75] Inventors: Michael J. Miller, Towanda; Martin C. Vogt, Monroston; Thomas A. Wolfe, Towanda, all of Pa.

[73] Assignee: GTE Products Corporation, Danvers, Mass.

[21] Appl. No.: 724,416

[22] Filed: Jul. 1, 1991

[51] Int. Cl.$^5$ .............................. C01F 5/24
[52] U.S. Cl. ............................. 423/430; 423/165; 423/158; 423/55; 423/431
[58] Field of Search ........... 423/240, 241, 242, 220, 423/232, 430, 431, 554, 165, 158, 55

[56] References Cited

U.S. PATENT DOCUMENTS

| | | |
|---|---|---|
| 3,041,135 | 6/1962 | Chittum .......................... 423/232 |
| 3,471,249 | 10/1969 | Markant et al. ................... 423/220 |
| 3,941,875 | 3/1976 | Tsuruta et al. ................... 423/232 |
| 3,996,335 | 12/1976 | Wolk et al. ...................... 423/232 |
| 4,035,166 | 7/1977 | Van Hecke ....................... 423/243 |

Primary Examiner—Theodore Morris
Assistant Examiner—Edward Squillante
Attorney, Agent, or Firm—James Theodosopoulos

[57] ABSTRACT

In the manufacture of ammonium paratungstate, sulfide is added to a tungsten-containing solution in order to precipitate molybdenum sulfide. Volatiles, including sulfides, evolved during this process are collected in a caustic scrubbing solution. The sulfide values in the caustic scrubbing solution may be reused to precipitate molybdenum sulfide by first treating the caustic scrubbing solution with alkaline earth chloride or sulfate to precipitate out alkaline earth carbonate.

1 Claim, No Drawings

REMOVAL OF CARBONATE FROM CAUSTIC SULFIDE SOLUTION

BACKGROUND

This invention is concerned with the process for removal of molybdenum from a tungsten-containing solution during the manufacture of ammonium paratungstate. A sulfide is added to the tungsten-containing solution which is then acidified to precipitate molybdenum sulfide which can then be removed by filtering, all as disclosed in U.S. Pat. Nos. 3,173,754, 3,939,245 and 4,115,513.

SUMMARY OF THE INVENTION

Volatiles evolved during the above described process are collected and scrubbed in a caustic scrubbing solution in order to prevent the escape of hydrogen sulfide into the atmosphere. This scrubbing results in the accumulation of sulfide and carbonate in the caustic scrubbing solution. The carbonate presumably comes from carbon dioxide in the air. The accumulated sulfide in the caustic scrubbing solution can be reused by adding it as part of the sulfide that is added to the tungsten-containing solution to precipitate molybdenum sulfide. However prior to such reuse of the caustic scrubbing solution, it is desirable to remove the carbonate therefrom, because high concentrations of carbonate make it difficult to adjust the pH and also because excessive foaming may occur when the tungsten-containing solution is acidified. This invention is concerned with the removal of such carbonate. The carbonate can be removed from the scrubber solution by treatment with an alkaline earth chloride or alkaline earth sulfate. This results in the formation of an alkaline earth carbonate which is only slightly soluble in water. The alkaline earth carbonate precipitate can be filtered out resulting in a scrubber solution containing lower carbonate concentrations and allowing reuse of the sulfide concentrations.

PREFERRED EMBODIMENT

In one example a 100 milliliter aliquot of caustic scrubber solution containing approximately 36 grams per liter of carbonate values and 73 grams per liter of sulfide values was treated with 5.55 grams of calcium chloride, a 1 to 1 stoichiometric ratio of calcium values to carbonate values. This resulted in the formation of a white precipitate. The slurry was filtered and the remaining solution was found to contain 13 grams per liter of carbonate values and 73 grams per liter of sulfide values. X-ray diffraction analysis confirmed that the white precipitate contained calcium carbonate. The caustic scrubber solution with reduced carbonate concentration was now suitable for re-use for the precipitation of molybdenum sulfide.

We claim:

1. In the manufacture of ammonium paratungstate involving the step of separating molybdenum from tungsten by adding a sulfide to a tungsten-containing solution in order to precipitate molybdenum sulfide and filtering out the molybdenum sulfide from the tungsten-containing solution and wherein volatiles evolved are collected in a caustic scrubbing solution in order to prevent escape of hydrogen sulfide into the atmosphere, the improvement which comprises treating the caustic scrubbing solution with an alkaline earth chloride or an alkaline earth sulfate in order to precipitate alkaline earth carbonate out of the solution, separating the precipitated alkaline earth carbonate from the caustic scrubbing solution by filtration, and adding the filtered caustic scrubbing solution to the tungsten-containing solution in order that sulfide values in the filtered caustic scrubbing solution may be reused to precipitate molybdenum sulfide.

* * * * *